Aug. 23, 1938.  D. TYRER  2,128,107
PROCESS FOR THE CONVERSION OF METAL SULPHIDES
Filed Sept. 13, 1934
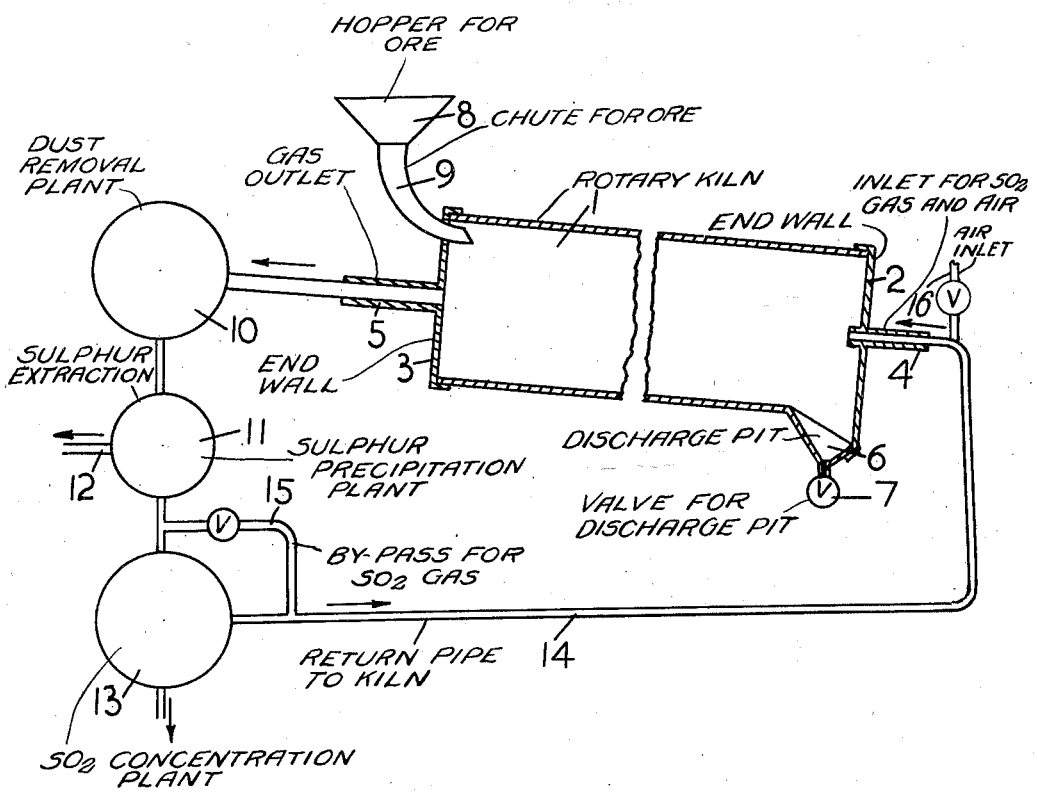
INVENTOR.
Daniel Tyrer
BY
george Lutz ATTORNEY Patented Aug. 23, 1938

2,128,107

UNITED STATES PATENT OFFICE 2,128,107

PROCESS FOR THE CONVERSION OF METAL SULPHIDES

Daniel Tyrer, Norton-on-Tees, England, assignor to Imperial Chemical Industries Limited, a corporation of Great Britain Application September 13, 1934, Serial No. 743,899
In Great Britain September 13, 1933

10 Claims. (Cl. 23—224)

This invention relates to the treatment of pyrites and iron sulphide ores for the production of sulphur and sulphur dioxide.

It has already been proposed to produce elementary sulphur by reaction between sulphur dioxide and iron sulphide or pyrites at temperatures above 600° C. It has also been proposed to treat sulphide ores, such as pyrites, with sulphur dioxide either in the pure form or in admixture with nitrogen, in a muffle or other furnace, the lower zones of which are maintained at a temperature not exceeding 950° C., and in this case the exit gases were treated for the separation of elementary sulphur and the residual gas recirculated to the process.

Processes of the kind described have suffered from the drawback that the rate of reaction between the sulphide ore and sulphur dioxide at temperatures up to the melting point of the solid reaction material is relatively low. I have now found that it is possible to employ higher temperatures for the reaction whilst preventing fusion of the reactants, provided that a suitable quantity of silica is admixed with the sulphide ore. If pyrites is ground and mixed with ground silica in equal molecular proportions the reaction mixture does not melt at temperatures up to 1400° C.

According to my invention, therefore, I subject the ore to the action of sulphur dioxide at a temperature of 1200–1400° C. in the presence of sufficient silica to prevent the material melting. Too great a proportion of silica should be avoided as it unnecessarily dilutes the sulphide material and makes it more difficult to maintain the required temperature. In some cases the initial ore may contain a large amount of free silica and may be treated for the removal of part of the same, e. g., by flotation of the sulphide values, to obtain a material suitable for treatment according to the invention. Thus it is necessary to adjust the silica content of the initial material, and preferably in such a way that approximately equal molecular proportions of iron sulphide and silica are present.

Inert gases such as nitrogen may accompany the sulphur dioxide, and oxygen, either as such or in the form of air, may be introduced to furnish heat by combining with the iron and possibly with part of the sulphur which is set free.

A proportion of solid carbonaceous matter, e. g., coke, may also be mixed with the sulphide ore to assist in the generation of heat, in which case a greater proportion of the sulphur is obtained in the elemental form instead of as sulphur dioxide.

According to the preferred form of the invention, pyrrhotite is ground, mixed with an equal molecular proportion of ground silica and is fed into a rotary kiln and passed in countercurrent to a stream of sulphur dioxide and oxygen or air. The gas stream, which may, if desired, be preheated before admission to the rotary kiln, is withdrawn from the upper end of the kiln and cooled in order to separate free sulphur. The residual gases consist of sulphur dioxide with or without nitrogen, and are recirculated, wholly or in part, to the kiln, after being concentrated, if necessary, in sulphur dioxide.

The solid reaction products leaving the kiln consist substantially of iron silicate, and any non-ferrous metals contained therein, e. g., copper, may be recovered in any customary manner.

The hot solid material may be used to preheat the inlet gas or gases.

The heat requirements are supplied very largely by the heat of formation of ferrous oxide and ferrosilicate. When ferrous sulphide of pyrrhotite ($Fe_3S_4$, or as sometimes given, $Fe_7S_8$), is used as the raw material there is a small deficiency of heat which is made good by allowing part of the sulphur of the ferrous sulphide to burn permanently to $SO_2$, which is finally eliminated from the cool gas as surplus production and used for any other purpose. If pyrites ($FeS_2$) is used as the raw material, further heat is required for its decomposition into FeS and sulphur, and this is supplied by the burning of a further proportion of the sulphur permanently to $SO_2$. If solid fuel is added, for example, coke, the production of a surplus of sulphur dioxide is naturally reduced. It will, therefore, be seen that the present invention is of particular importance in relation to the treatment of pyrrhotite.

One method of carrying out the invention is illustrated in the accompanying drawing, which is a diagrammatic flowsheet. In this drawing reference numeral 1 denotes a rotary kiln fitted with end walls 2 and 3 through which pass the gas inlet and outlet ducts 4 and 5 respectively. The bottom of the end wall 2 is developed to form a discharge pit 6 which is provided with a valve 7, for the solid product. The solid material is fed into the kiln from a hopper 8 by means of a chute 9 passing through the end wall 2.

A mixture of air and $SO_2$ is blown through the duct 4 and is preheated by the already reacted solid material moving down the kiln from the reaction zone. Approximately one third of the length of the kiln is occupied by such reacted solid material and serves as a preheating zone. The gases then enter the next portion of the kiln and meet hotter material containing ferrous sulphide, which is thus oxidized to ferrous oxide and sulphur dioxide. The ferrous oxide combines with the silica to form a refractory silicate, and as the maximum temperature is 1400° C. no appreciable melting takes place. Immediately after the disappearance of all free oxygen, some of the ferrous sulphide is converted by reaction with $SO_2$ into ferrous oxide and free sulphur. This reaction also takes place higher up the kiln so long as the solid material is sufficiently heated by the gases.

The exit gases consist essentially of free sulphur, sulphur dioxide and nitrogen. They pass from duct 5 to a dust removal plant 10 and thence to a sulphur precipitation plant 11. Sulphur is extracted at 12 and the uncondensed gases pass to a concentration plant 13, where they are washed with a solvent for $SO_2$, for example an aqueous solution of sodium citrate and ammonium phosphate, which is regenerated by heating to expel the dissolved gas. The resulting $SO_2$ is passed by pipe 14 for instance by means of a blower (not shown in the drawing) to the inlet duct 4 of the kiln where it is mixed with a controlled proportion of air added through air inlet 16. A portion of the gases from the precipitation plant 11 is by-passed through pipe 15 in order to control the amount of nitrogen in circulation.

To make one metric ton of sulphur by the above described process, the quantities of materials (starting with calcined pyrites or pyrrhotite) are as follows:

Raw materials:

| | T. |
|---|---|
| FeS | 3.08 |
| $SiO_2$ | 2.10 |

Inlet gas:

| | Cubic metres |
|---|---|
| Air | 2,400 |
| By-passed gas | 1,810 |
| $SO_2$ | 507 |

Exit gas:

| | Cubic metres |
|---|---|
| Sulphur vapor | 375 |
| $SO_2$ | 1,030 |
| $N_2$ | 3,295 |

The gas quantities are measured at the ordinary temperature and pressure.

I claim:

1. A process for treating iron sulphide ores which comprises subjecting said ores to the action of sulphur dioxide at a temperature of 1200–1400° C. and in the presence of sufficient silica to prevent the material melting whereby the major proportion of the sulphur contained in said ore is recovered as elemental sulphur.

2. A process as set forth in claim 1, in which the material contains approximately equal molecular proportions of iron sulphide and silica.

3. A process for treating iron sulphide ores which comprises moving said ores in counter-current to a stream of gas containing sulphur dioxide and oxygen, the proportion of oxygen being less than that required to combine with the whole of the iron, and maintaining a reaction zone at a temperature of 1200–1400° C. wherein the iron sulphide is caused to react with the sulphur dioxide in the presence of sufficient silica to prevent the material melting whereby the major proportion of the sulphur contained in said ore is recovered as elemental sulphur.

4. A process as set forth in claim 3, in which a proportion of solid carbonaceous matter is mixed with the sulphide ore.

5. A process as set forth in claim 3, in which the gaseous reaction products are treated for removal of free sulphur and at least part of the residual gas is recirculated to the reaction zone.

6. A process for treating iron sulphide ores which comprises moving said ores in counter-current to a stream of sulphur dioxide and air, the proportion of air being less than that required to combine with the whole of the iron, maintaining a reaction zone at a temperature of 1200–1400° C. wherein the iron sulphide is caused to react with the sulphur dioxide in the presence of sufficient silica to prevent the material melting whereby the major proportion of the sulphur contained in said ore is recovered as elemental sulphur, cooling the gaseous reaction products to separate free sulphur therefrom, washing at least part of the residual gases with a solvent for $SO_2$, recovering rich $SO_2$ gas by heating said solvent, and returning at least part of the recovered $SO_2$ to the reaction zone.

7. A process for treating iron sulphide ores which comprises moving said ores in counter-current to a stream of sulphur dioxide and air, the proportion of air being less than that required to combine with the whole of the iron, maintaining a reaction zone at a temperature of 1200–1400° C. wherein the iron sulphide is caused to react with the sulphur dioxide in the presence of sufficient silica to prevent the material melting whereby the major proportion of the sulphur contained in said ore is recovered as elemental sulphur, cooling the gaseous reaction products to separate free sulphur therefrom, dividing the residual gases into two portions, recovering $SO_2$ from one portion, mixing at least part of the recovered $SO_2$ with the other portion, and returning the mixed gases to the reaction zone.

8. A process for treating an iron sulphide material of the type corresponding in chemical composition to pyrrhotite which comprises subjecting said material to the action of sulphur dioxide at a temperature of 1200° to 1400° C. in the presence of sufficient silica to prevent the material melting, whereby the major proportion of the sulphur contained in said material is recovered as elemental sulphur.

9. In a process for treating an iron sulphide ore, the steps comprising continuously agitating a mixture of silica and ore while heating it at a temperature above the fusion point of the ore, and contacting the ore with sulphur dioxide, the amount of silica being such that disadvantageous sintering is avoided despite the fact that the ore is being agitated above its sintering temperature.

10. In a process for treating an iron sulphide ore wherein the ore is reacted with sulphur dioxide to produce elemental sulphur, the step comprising mixing the sulphide ore with not substantially less than about an equi-molecular amount of silica, and effecting the reaction between the ore and sulphur dioxide at a temperature above the sintering temperature of the ore, sintering and fusion of the ore being substantially prevented by the admixed silica.

DANIEL TYRER.